July 30, 1963  M. NEWHOUSE, JR  3,099,249
CATTLE HOLDING CHUTE
Filed March 7, 1960  5 Sheets-Sheet 1

INVENTOR.
MARINUS NEWHOUSE, JR.
BY
Buckhorn, Cheatham & Blore
ATTORNEYS

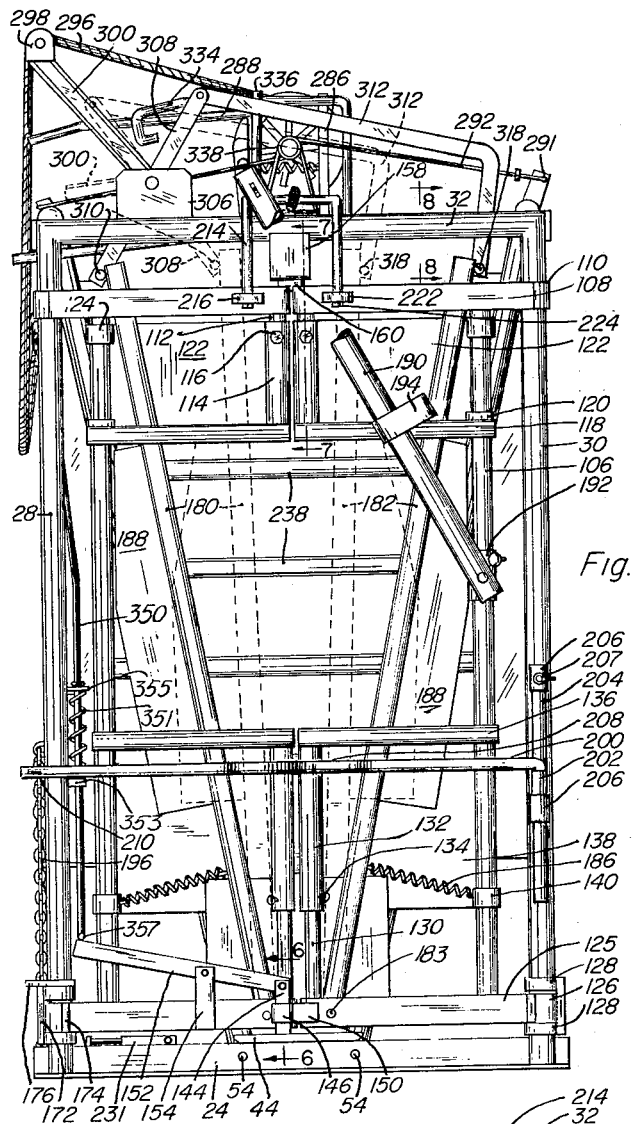
Fig. 3
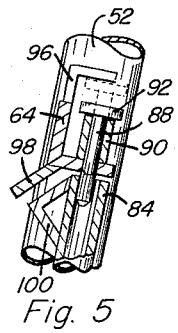
Fig. 5
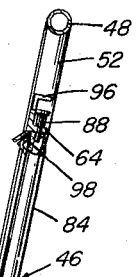
Fig. 4
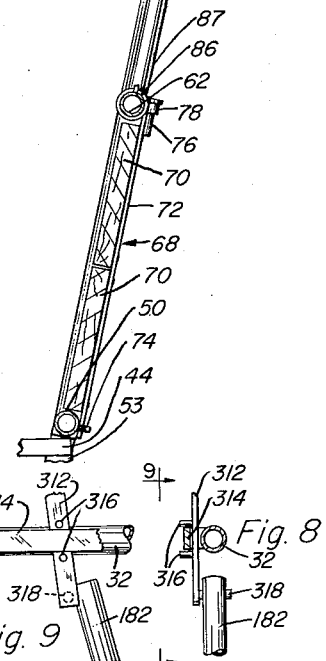
Fig. 8
Fig. 9
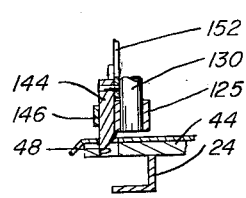
Fig. 6
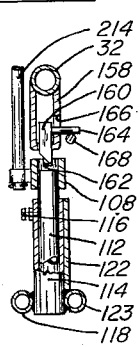
Fig. 7
INVENTOR.
MARINUS NEWHOUSE, JR.
BY
Buckhorn, Cheatham & Blore
ATTORNEYS July 30, 1963

M. NEWHOUSE, JR 3,099,249

CATTLE HOLDING CHUTE

Filed March 7, 1960

INVENTOR.
MARINUS NEWHOUSE, JR.
BY
Buckhorn, Cheatham & Blore
ATTORNEYS

July 30, 1963  M. NEWHOUSE, JR  3,099,249
CATTLE HOLDING CHUTE

Filed March 7, 1960  5 Sheets-Sheet 5

INVENTOR.
MARINUS NEWHOUSE, JR.
BY
Buckhorn, Cheatham & Blore
ATTORNEYS

United States Patent Office 3,099,249
Patented July 30, 1963

3,099,249
CATTLE HOLDING CHUTE
Marinus Newhouse, Jr., Box 94B, Rte. 1,
Terrebonne, Oreg.
Filed Mar. 7, 1960, Ser. No. 13,077
9 Claims. (Cl. 119—99)

The present invention relates to a livestock restraining device and more particularly to a chute in which cattle or other livestock may be held relatively motionless while inoculating, branding or doing similar work upon an animal.

A principal object is to provide an easily operated but rugged chute that will withstand the abuse incident to its use.

Another object is to provide a chute having movable parts for securely clamping an animal in an immovable position but which can be released simultaneously and easily by an operator to minimize possibility of an animal injuring itself.

Still another object is to provide a means for assuring closing the discharge gate means of a chute prior to the opening of the entrance gate means.

A further object is to provide a chute having means for providing ready access to the various parts of an animal while securely holding the same.

Another object is to provide a chute having easily operated means to secure livestock in an immovable position.

Other objects and advantages of the invention will become more apparent hereinafter.

In accordance with the illustrated embodiment of the invention, I have provided a livestock holding chute including a rugged frame having a pair of side panels swingably mounted to be brought into engagement with the opposite sides of an animal to be restrained. Means are provided to engage the neck of an animal to hold its head against sidewise movement and which can be brought to operative position simultaneously with the closing of the side panels. Entrance and discharge gates are provided with means to assure closing of the latter before opening of the former. Simply and easily operated means are also provided to release an animal and permit it to escape from the chute.

For a more detailed description of the invention, reference is made to the accompanying specification and the drawings wherein:

FIG. 3 is an elevation of the discharge end of the chute;

FIG. 4 is a fragmentary sectional view taken along line 4—4 of FIG. 2;

FIG. 5 is an enlarged view of a portion of the apparatus shown in FIG. 4;

FIG. 6 is an enlarged sectional view taken along line 6—6 of FIG. 3;

FIG. 7 is a sectional view taken along line 7—7 of FIG. 3;

FIG. 8 is a sectional view taken along line 8—8 of FIG. 3;

FIG. 9 is a view looking in the direction of the arrows 9—9 of FIG. 8;

Figure 1:
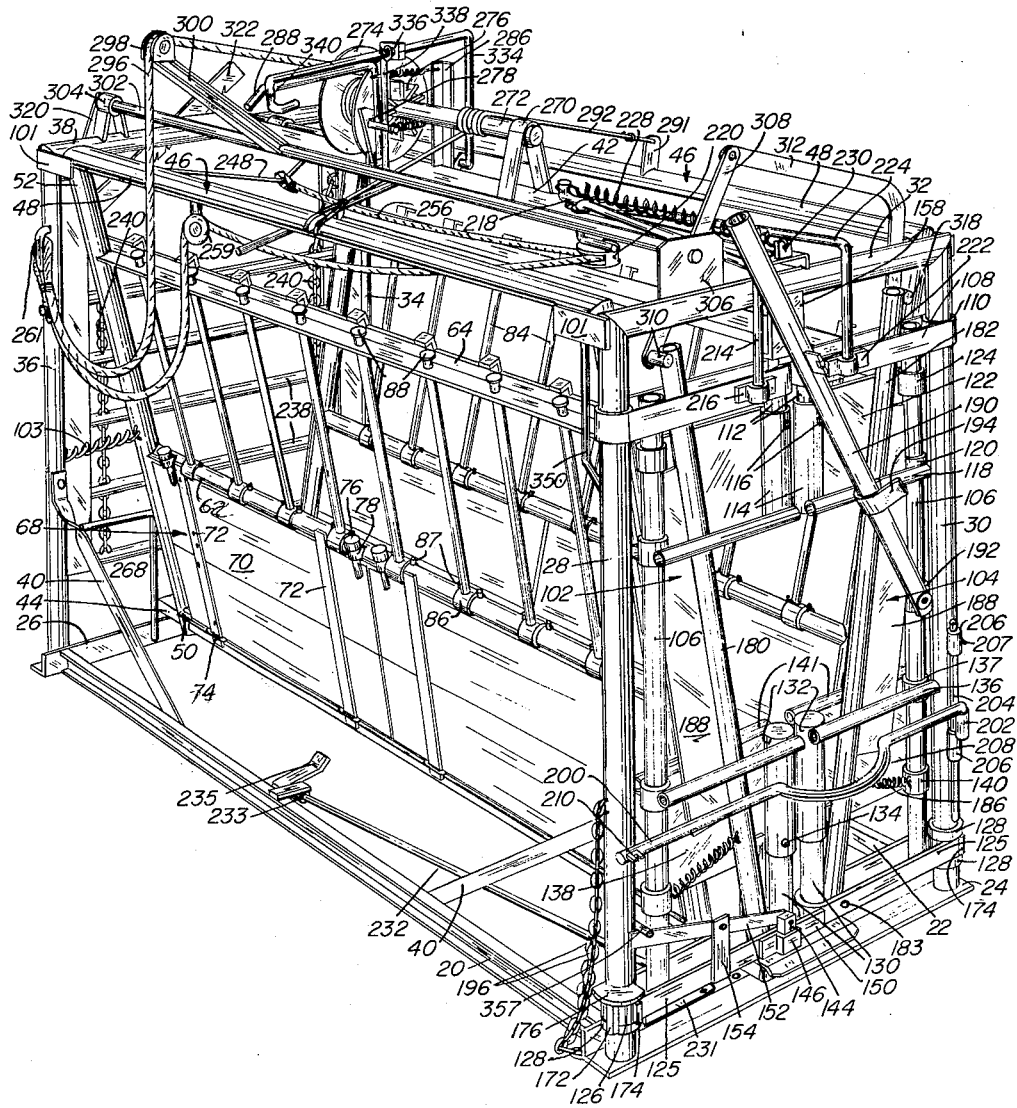
FIG. 1 is a perspective view of a chute embodying the invention.
Figure 10:
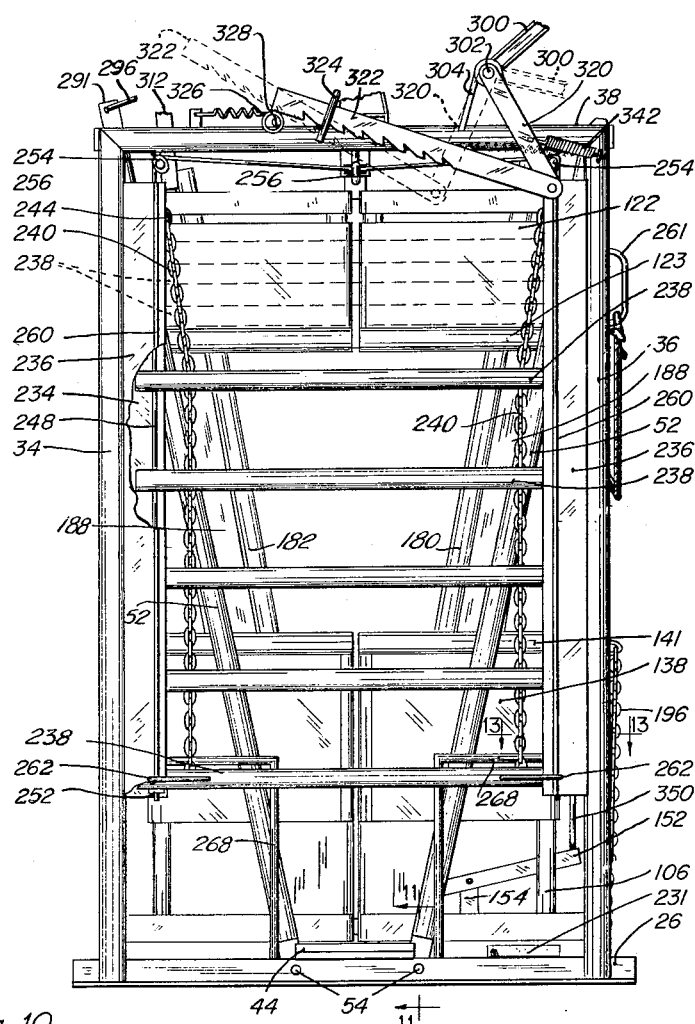
FIG. 10 is an elevation of the entrance end of the chute.
Figure 11:
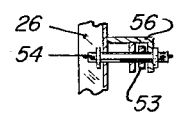
FIG. 11 is a sectional view of a portion of the apparatus taken along line 11—11 of FIG. 10.
Figure 12:
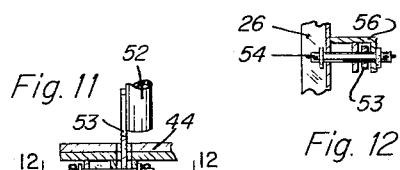
FIG. 12 is a sectional view taken along line 12—12 of FIG. 11.
Figure 13:
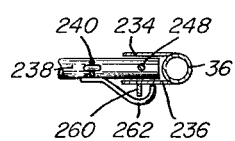
FIG. 13 is a sectional view of a portion of the apparatus taken along line 13—13 of FIG. 10.

Referring to the drawings and particularly to FIG. 1, the illustrated chute comprises a frame including a base portion comprising a pair of opposite side members 20, 22 and end members 24, 26. Secured at their lower ends, as by welding, to the ends of the member 24 are a pair of uprights 28, 30 having a cross member 32 secured to and extending between their upper ends. Similarly, a pair of uprights 34, 36 (see FIG. 10) are secured to the ends of the frame member 26 and secured to and extending between the upper ends of the uprights 34, 36 is a cross member 38. Diagonal braces 40 may be provided between the various uprights and the adjacent side frame members 20, 22. Secured to the cross members 32, 34 and extending therebetween is a longitudinal frame member 42 which is spaced medially between the opposite sides of the chute. Secured at its opposite ends to the bottom frame members 24, 26 is a platform 44 upon which an animal stands while held in the chute. To embrace the sides of an animal on the platform 44, there is mounted on the frame adjacent each of the opposite sides of the platform a pair of side panels 46, each of which comprises a rectangular frame structure including a top frame member 48, a bottom frame member 50 and a pair of opposite parallel end frame members 52. With reference to FIGS. 11 and 12, each of the end frame members 52 has an extension plate 53 secured to its lower end and which receive hinge pins 54 supported in the adjacent frame members 24, 26 and brackets 56 secured to such frame members. Suitable means such as washers and cotter pins 58 secure the hinge pins in position. The hinge pins 54 permit the side panels 46 to be swung by means to be discussed subsequently into and out of clamping engagement with the sides of an animal.

Figure 2:
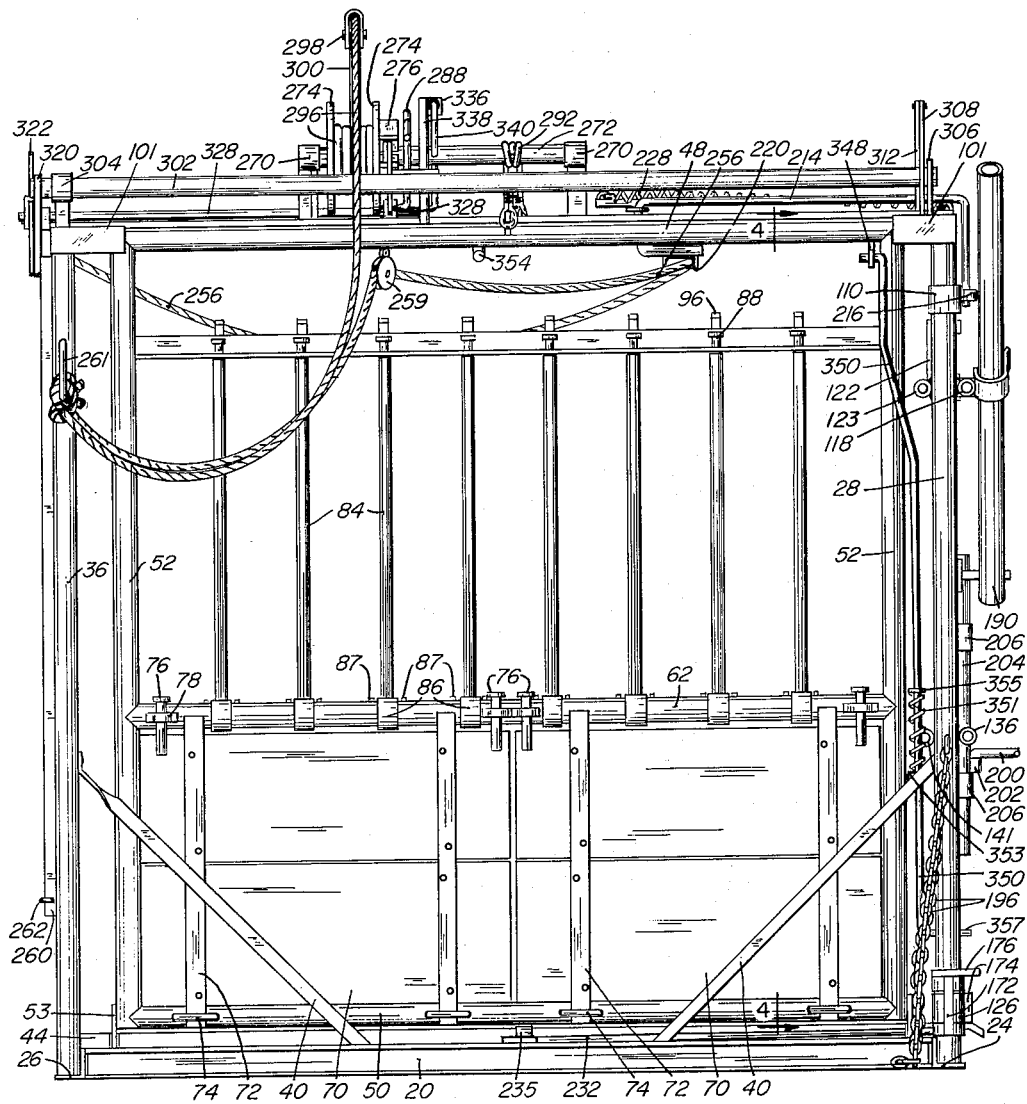
FIG. 2 is a side elevation of the chute.

Secured to and extending between the end frame members 52 of each side panel is a pair of vertically spaced cross members 62, 64 and removably secured between the lower cross member 62 and the bottom frame member 50 of each side panel is a pair of subpanels 68, each of which may comprise wooden planks 70 or other suitable sheet material bolted to a pair of strap-like members 72 which extend in a general vertical direction beyond the upper and lower limits of the plank. As best shown in FIG. 2, the lower ends of the strap members are slipped into hook elements 74 provided on the bottom frame member 50. The top portions of the straps are adapted to engage against the side of the cross member 62 and the subpanels 68 are each held in upright position by means of a pair of pins 76 slidably received in pin holders 78 formed on the cross member 62. Upon removal of the pins 76, the side panels can be swung slightly outwardly and the lower end of the straps 72 lifted out of the hook elements 74 so that the subpanels can be entirely removed to permit access to the lower parts of an animal held between the side panels 46.

Extending between the cross members 62, 64 of a side panel are a plurality of generally vertically extending, tubular bars 84 which are hingedly mounted upon the lower cross members 62. In the illustrated embodiment, the bars 84 are each formed with an integral loop 86 (see FIG. 4) which extends about the cross member 62 permitting the bars to be swung at right angles to the general plane of the panel frame. The cross member 62 may be provided with lugs 87 on each of the opposite sides of each loop to retain the loops in position on the member. Cooperative means are provided on the bars 84 and the upper cross member 64 to releasably secure the bars to the upper cross member. Such means comprise pins 88 which slide within pin guides 90 secured to the upper frame member 64. The lower ends of the pins are adapted to be received within the upper ends of the bars 84 as shown in FIG. 5 with the pin head 92 engaging the top of the guide 90. Upon lifting the pins 88 to the dotted line position shown in FIG. 5, the bars 84 are free to be swung downwardly to permit more ready access to the upper parts of the body of an animal held between the side panels 46. A stop member 96 can be provided to prevent complete removal and possible accidental loss of a pin. A downwardly extending flange or stop 98 may also be secured to each of the cross members 64 and a cooperative bumper 100 provided on each of the bars at its upper end to position the bar in alignment with the pin guide 90 when it is swung back to its vertical position thereby facilitating reengagement of a pin 88 in the end of a bar. The bumpers 100 also serve automatically to lift the pins 88 as the bars 84 are raised. In their fully opened position the side panels 46 rest against stops 101 provided on the frame uprights. Suitable means such as springs 103 shown in FIG. 1 may be provided to urge the side panels 46 to their open or non-clamping position.

With particular reference to FIGS. 1 and 3, pivotally mounted one on each of the uprights 28, 30 is a pair of discharge gate members 102, 104 and which in their principal parts are substantially identical in construction. Each comprises a vertical frame member 106 which is positioned immediately adjacent the corresponding upright 28 or 30. Each vertical frame member 106 is welded or otherwise rigidly secured at its top end between the opposite portions of a horizontally extending, U-shaped strap member 108, the ends of which are secured at one end of a collar 110 pivotally surrounding the adjacent upright. The bight of each strap member 108 extends around and is secured to a downwardly extending rod 112 over which slidably fits a tube 114 adapted to be fixed in various positions on the rod by suitable means such as a bolt head set screw 116. The tube 114 is held in parallel relation to the vertical frame member 106 by means of a brace rod 118 secured to the lower end of the tube at one end and at its other end to a collar 120 slidably engaging the frame member 106. Also secured to the tube 114 is one edge of a plate 122 which at its opposite lower corner is secured to the collar 120 and at its upper corner to a further collar 124 also slidably fitting upon the frame member 106. This construction permits vertical adjustment of the position of the plates 122, the advantage of which will be described hereinafter. As may be seen in FIG. 10, the lower edge of each plate 122 may be covered with a rounded element 123 to prevent cutting of an animal by the plate edge.

The lower end of each frame member 106 is also secured between the opposite portions of a horizontally extending U-shaped strap 125, the ends of which are secured to a collar 126 rotatably fitting about the corresponding upright 28 or 30. Secured to the uprights 28, 30 immediately above and below the collars 126 are rings 128 which serve to maintain the gate members in their vertical position relative to the uprights. Secured within the bight of each of the straps 125 and extending vertically therefrom is a post 130 upon which is slidably received a tube 132 which is adapted to be secured in various vertical positions relative to the post by means of a bolt-head set screw 134. A bracing rod 136 extends between the upper end of the tube 132 and a collar 137 slidably embracing the gate frame member 106. Secured along one edge to the tube 132 is a plate 138 which is secured at its opposite upper corner to the collar 137 and at its lower corner to a further collar 140 slidably mounted upon the member 106. As will be apparent, the arrangement described permits vertical adjustment of a plate 138, the purpose of which will be described hereinafter. As may be seen in FIGS. 1 and 3, the upper edges of the plates 138 preferably are provided with rounded protecting elements 141.

Means are provided for securing the gate members 102, 104 in closed position, such means comprising at the bottom of the gates a latch pin 144 mounted for vertical movement in a latch guide 146 provided on the outwardly facing portion of the strap 125 of gate 102. The pin is adapted to engage within the notch 148 provided in the platform 44 to hold the gate closed. Extending from the gate member 102 in a position to overlap the gate member 104 and retain it in closed position is a bar 150. The latch pin 144 is pivotally connected to a releasing lever 152 which is pivotally mounted on a bracket 154 secured to the strap 125. Means for actuating the lever 152 will be described subsequently.

A latch means is also provided at the upper end of the gate members 102, 104, such latch means comprising an inverted U-shaped bracket 158 (see FIG. 7) secured as by welding to the cross member 32. Slidably mounted in the bracket 158 is a latch 160 adapted to fit within notches 162 formed in the upper edges of the straps 108, the latch being sufficiently wide and positioned as to overlap the straps of both gate members when they are in closed position as may be seen in FIG. 3. Means are provided to raise the latch 160 including a pin 164 secured thereto and extending outwardly through a slot 166 in one of the walls of the bracket and which pin is adapted to be lifted by a rod 168 actuated by means to be described subsequently.

Preferably, cooperative stop members 172 are provided on each of the uprights 28, 30 and cooperative stop members 174 are provided on each of the gate members 102, 104 to limit the opening swing of the gates. A chain guard 176 may be provided above the stop members 172, 174 on the upright 28 for a purpose to be explained.

Mounted one on each of the gate members 102, 104 in cooperative relation is a pair of neck clamping bars 180, 182. Each bar is pivotally supported at its lower ends between the opposite portions of the lower straps 125 by means of pins 183 extending through the strap portions, the pins being positioned closely adjacent the posts 130. The bars 180, 182 extend generally vertically upwardly with their upper ends extending between opposite portions of the straps 108 (see FIG. 1) at the upper end of the gate members and between which they may slide. The bars 180, 182 are also adapted to slide between the plates 122 and braces 118, and plates 138 and braces 136 as they move from an upwardly diverging position, or a non-clamping position shown in solid lines in FIG. 3 and in which they would be spaced from the neck of an animal within the chute into a substantially parallel relation or neck clamping position indicated in dotted lines in FIG. 3.

Suitable means such as a spring 186 may be connected between the clamping bars 180, 182 and collar 140 to urge the bars to open position. Preferably, each of the neck clamping bars has a plate 188 secured thereto on the side facing away from the opposite bar and the purpose of which will be described hereinafter.

Supported on the gate member 104 is a head hold-down bar 190 which is pivotally mounted upon a collar 192 which is vertically slidable upon the vertical gate frame member 106, suitable means, not shown, being provided to permit the collar to be fixed at various elevations on the column. A bracket 194 may be provided on the brace 118 for holding the hold-down bar in an out-of-the-way position. In use the hold-down bar is removed from the bracket 194 and swung down across the top of the head of an animal secured between the clamping bars 180, 182. One of a pair of chains 196 may be utilized to secure the hold-down bar 190 and prevent an animal from raising its head, the chains 196 being suitably secured to the upright 28. The chain guard 176 previously mentioned is for the purpose of preventing the chains 196 from accidentally coming between the stops 172, 174.

A nose holding bar 200 may also be provided and which bar may be pivotally received in a bracket 202 secured to a rod 204 vertically slidable in brackets 206 suitably secured to the upright 30. A locking device indicated at 207 may be provided to secure the rod 204 at any desired elevation. The vertical movement of the rod 204 makes it possible to raise and lower the bar 200 to adjust for the size of the animal held in the chute. The bar 200 is provided with a loop 208 for receiving the nose of an animal and the bar is adapted to be held in position by means of one of the chains 196 which can be wrapped about the bar or engaged within a catch 210 provided thereon.

Figure 15:
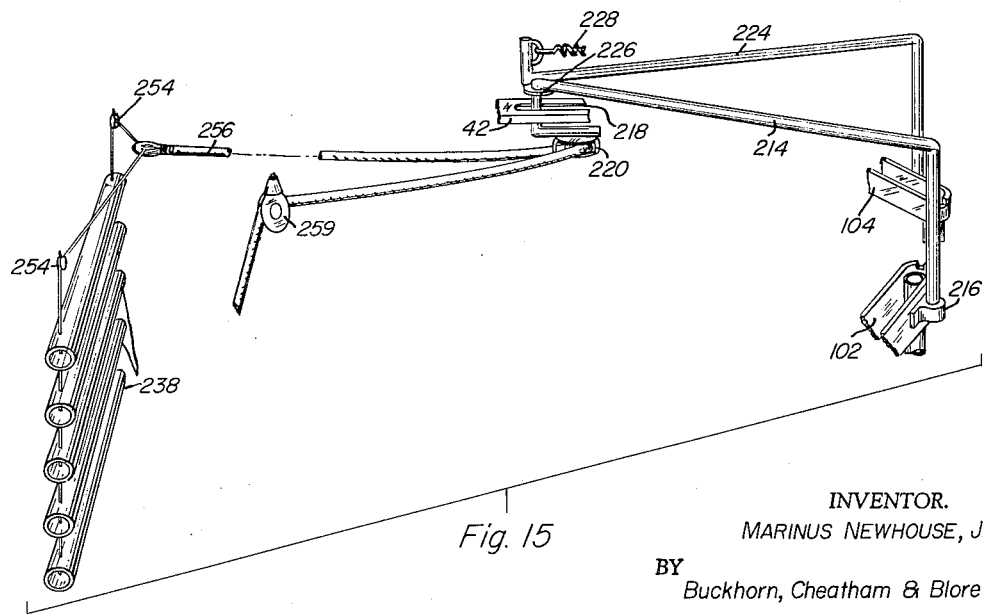
FIG. 15 is an enlarged fragmentary perspective view of a further portion of the apparatus for operating the chute.

With particular reference to FIGS. 3 and 15, means are provided for closing the gates 102, 104 and which means includes an arm 214 comprising a vertical portion having its lower end pivotally received within a bracket 216 secured to the outer portion of strap 108 of the gate 102. The arm 214 includes a further portion which extends horizontally rearwardly from the gate 102 over the frame member 42, the rearward end of the arm being bent downwardly and extending through a slot 218 formed in the frame member 42. To the lower end of the arm is secured a sheave 220. Pivotally secured by means of a bracket 222 to the gate member 104 is an arm 224 which also extends rearwardly over the frame member 42 and is pivotally secured to the arm 214 by a bracket 226. The gates are urged to an open position by means of a spring 228 connected between the arms and a bracket 230 on the end of the frame. The means to urge the gate members 102, 104 to a closed position will be described more completely hereinafter.

Means are also preferably provided positively to hold the entrance gate members 102, 104 in open position when desired. Such means comprises an arm 231 positioned beneath the gate 102 in position to be raised behind the strap 125 when the gate is opened. The arm 231 is fixed at one end to a shaft 232 rotatably supported in brackets 233, rotation of the shaft to raise the arm being caused by depression of a foot pedal 235 fixed to the shaft.

The opposite end of the chute is provided with an entrance gate structure and which will be described with particular reference to FIGS. 10 to 13. Welded to each of the uprights 34, 36 is a pair of parallel plates 234, 236 which define opposed facing channels adapted slidably to receive the opposite ends of a plurality of horizontally disposed, cylindrical bars 238. The bars 238 are suspended in vertically spaced relation by welding or otherwise suitably securing the bars at spaced intervals to a pair of chains 240 secured at their upper ends to the upper ends of the flanges 234. Each of the bars 238 is provided at each of its opposite ends with a vertically extending opening through which are threaded the opposite end portions of a flexible element such as a cable 248 which preferably is of slightly smaller diameter than the openings so that the bars may slide thereon. A clamp 252 is provided at each cable end so that the cable cannot be pulled through the lowermost element. The cable 248 is threaded through pulleys 254 suspended from the upper cross member 38 and the bight of the cable is connected to one end of a cable or rope 256 which is threaded through the sheave 220 (see FIG. 15) on the actuating arms for the gate members 102, 104 and thence back through a sheave 259 which is suspended from a top frame member 48 of one of the side panels, the end of the rope being secured to a cleat 261 on the upright 36. Preferably, the weight of the bars 238 is such that the force to raise the bars is greater than that required to swing the gate members 102, 104 from an open to a closed position. It will thus be seen that manually pulling on the free end of the rope 256 will first cause the gate members 102, 104 to swing from their open to closed position whereupon further force will cause the bars 238 to be lifted and form an access for an animal beneath the lifted bars into the space provided between the side panels 46. The elevated position of the bars 238 is indicated in dotted lines in FIG. 10.

To prevent an animal from lifting the bars and entering the chute on its own initiative, each of the flanges 236 is provided with a flange or ridge 260 (see FIG. 13) which is slidably embraced by an arm 262 fixed to the corresponding end of the lowermost bar 238. So long as such bar is lifted evenly at both of its ends, that is, maintained in a horizontal position, the arms 262 will slide smoothly over the ridges 260. However, if the bar 238 should be tilted, the arms 262 will tend to bind upon the ridges 260 and prevent the bar from being lifted and such tilting will ordinarily occur if an animal extends his nose beneath the bar in an attempt to lift the same. Guards 268 may be secured to the uprights 34, 36 and base frame member 26 to prevent an animal from escaping through the space between an upright and a side panel 46 when the bars 238 of the entrance gate are lifted.

Figure 14:
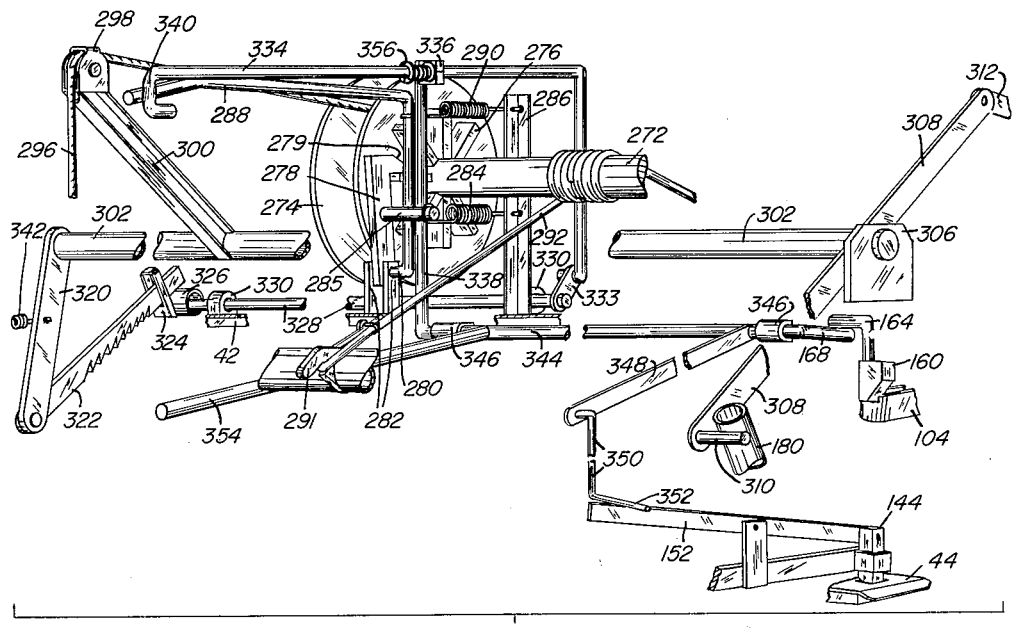
FIG. 14 is an enlarged fragmentary perspective view of a portion of the apparatus for operation of the chute.

With reference to FIGS. 1 and 14 in particular, suitably journaled at its opposite end in brackets 270 mounted upon the top longitudinal cross member 42 is a shaft 272 to which is fixed a drum 274 having a plurality of tooth elements 276 provided on one face thereof which are adapted to be engaged by a pawl 278 pivotally mounted upon a pivot pin 280 supported between ears 282 extending upwardly from the longitudinal frame member 42. The pawl 278 is formed with a tapered upper face 279 and is biased into tooth engaging position by means of a spring 284 having one end secured to an arm 285 on the pawl and its other end to an arm 286 secured to and extending upwardly from the frame member 42. The pawl is adapted to be swung to a non-tooth engaging position by means of a lever 288 having one end secured to the pivot pin 280 from whence it extends upwardly past the arm 285 and thence outwardly toward one side of the machine to a point where the end of the lever can be grasped by an operator and pulled downwardly to pivot the lever about the pivot pin 280 so as to engage the arm 285 and force the pawl out of engagement with the teeth of the drum 274. A spring 290 connected between the lever 288 and the upper end of the arm 286 is provided to return the lever to its inactive position.

Secured to eyes 291 of the opposite side panels 46 are the opposite ends of a flexible element or cable 292, the middle of which is threaded through and suitably secured in an opening through the shaft 272. Rotation of the shaft 272 in one direction will cause the cable end portions to wind upon the shaft 272 drawing the side panels 46 together, whereafter rotation of the shaft in the opposite direction will permit the side panels to move apart to their open position.

Secured at one end to the drum 274 is a cable or rope 296 which is wound about the drum several times. The rope leads from the drum over a pulley 298 mounted on the end of an arm 300 secured to a shaft 302. The free end of the rope is tied to the cleat 261. The shaft 302 is journaled at one end in a bracket 304 provided on the frame cross member 38 and at its other end in a bracket 306 secured to the frame cross member 32. Fixed to the shaft 302 adjacent the gate members 102, 104 is an arm 308 having a pin 310 extending from its lower end in a position to engage the upper end of the clamping bar 180. Pivotally connected to the upper end of the arm 308 is another arm 312 which slides between the frame member 32 and a guide 314, the arm 312 having a pair of vertically spaced bosses 316 thereon adapted to engage the upper and lower surfaces of the guide to retain the arm in vertical position as shown in FIGS. 8 and 9. Extending from the lower end of the arm 312 is a pin 318 which is adapted to engage the upper end of the neck clamping bar 182. As may be seen from FIG. 1, rotation of the shaft 302 in a counterclockwise direction will similarly rotate the arm 308 causing the pin 310 thereof to move the neck clamping bar 180 to neck clamping position. As the upper end of the arm 308 rotates, the arm 312 will be pulled across the chute causing the pin 318 to move the arm 182 to neck clamping position.

Means are provided to latch and hold the neck clamping bars 180, 182 in their clamping position. Referring now more particularly to FIGS. 10 and 14, fixedly secured to the end of the shaft 302 at the entrance end of the chute is one end of a lever 320 to the opposite end of which is pivotally secured a ratchet bar 322 having a plurality of teeth adapted to engage a catch 324. The end of the ratchet bar 322 extends over a lifting cam 326 eccentrically mounted upon a shaft 328. The shaft 328 is rotatably journaled in brackets 330 secured to the frame member 42. The shaft 328 terminates adjacent the drum 274 and has fixedly secured to its end a short arm 333 to which is pivotally secured an end of a lever 334 which extends vertically upwardly for a brief distance and then is bent horizontally through a loosely fitting collar 336 mounted on an arm 338. The terminal end of the lever is formed with a handle 340 which may be manually grasped by the chute operator and pulled whereupon the shaft 328 will be rotated to rotate the cam 326 and raise the ratchet bar 322 out of engagement with the catch 324.

Connected between the lever 320 and the upright 36 is a spring 342 which upon release of the ratchet bar 322 causes the lever 320 to be swung in a counterclockwise direction as it is shown in FIG. 10 thereby causing the arms 308, 312 to be swung apart permitting the neck clamping bars 180, 182 to swing apart to their non-clamping position.

The arm 338 mentioned above is fixed to and extends upwardly from a shaft 344 journaled in brackets 346 secured to the longitudinal frame member 42. Secured to the end of the shaft 344 adjacent the discharge gates is the lever 168 which operates the upper gate latch 160. Also fixedly secured to the shaft 344 so as to operate therewith is a lever 348 to the end of which is pivotally connected a rod 350 having a foot 352 formed thereon extending over the operating lever 152 for the latch pin 144. With reference to FIG. 2 the rod 350 is biased upwardly by means of a spring 351 engaged between a stop 353 fixed to the adjacent frame diagonal 40 and a stop 355 secured to the rod.

Also fixedly secured to the shaft 344 is an operating lever 354 which extends outwardly to one side of the chute. As will be apparent from FIG. 14, rotation of the shaft 344 by downward movement of the operating lever 354 will cause the latches 160, 144 to be lifted so as to permit the gate members 102, 104 to swing open. Rotation of shaft 344 will also cause rotation of the arm 338 which is mounted so as to engage the arm 285 of pawl 278 and move it to releasing position upon rotation of the shaft 344. A stop 356 is provided on the lever 334 for engagement by the collar 336 when the arm 338 is rotated so that the lever 334 will also be moved.

*Operation*

We will assume first a condition where an animal has just been permitted to leave the chute, the side panels 46 will be spread apart, the discharge gates 102, 104 open and the entrance gate will be down. It will be understood that the chute of the invention will ordinarily be aligned with the end of a narrow runway in which the animals to be passed through a chute will be aligned in tandem. If the animal at the end of the runway is one that need not be treated in the chute, the operator can depress the foot pedal 235 to hold gate members 102, 104 open and can then pull on rope 256 to lift the bars 238 to permit the animal to leave the runway through the chute. As soon as the animal clears the chute the operator releases the foot pedal 235 whereupon the gate members 102, 104 will be swung to closed position because of the tension on the rope 256. If, on the other hand, with the chute opened it is desired to hold the next animal in the chute, the operator will first pull upon the end of the rope 256. This will apply force through the sheave 220 to the arms 214, 224 causing them to move toward the opposite end of the chute and swing the gate members 102, 104 to a closed position. The latches 144, 160 will automatically drop into their respective notches to latch the gate members in closed position. When the gate members 102, 104 are closed, the bars 238 of the entrance gate will be pulled upwardly permitting an animal to enter into the chute. As soon as the animal to be held in the chute enters between the side panels 46, the operator releases the rope 256 whereupon the bars 238 will immediately drop preventing an animal from backing out of the chute. If an animal does not voluntarily project its head up through the opening between the neck clamping bars 180, 182, it is prodded forwardly in the chute, or, if necessary, a rope is threaded through the opening and fastened to a halter or about the neck of the animal and the animal pulled forwardly until its head extends outwardly through the opening. As may be seen in FIG. 10, the upper plates 122, the lower plates 138 and the plates 188 attached to the neck clamping bars 180, 182 effectively block off any sight for the animal except through the desired opening between the neck clamping bars. When the animal is sufficiently forward in the chute, the operator pulls upon the rope 296. This causes the arm 300 to be pulled downwardly to rotate the shaft 302 and cause the neck clamping bars 180, 182 to be moved together and into clamping position as described previously. This also causes the rope to be pulled off of the drum 274 rotating the drum and the shaft 272. As the shaft 272 rotates, the opposite portions of the cable 292 connected to the opposite side panels 46 will be wound about the shaft causing the side panels to be pulled together and into clamping position against the sides of an animal. The drum teeth 276 will, of course, engage the upper bevelled face 279 of the pawl 278 as the drum is revolved automatically to move the pawl out of position as each tooth swings across it. Rewinding of the drum will, on the other hand, be prevented by the pawl 278 until it is intentionally released.

After the neck clamping bars 180, 182 and the side panels 46 have been moved into clamping position, the head hold-down bar 190 can be swung down across the top of the head of an animal and thereafter the nose holding bar 200 is swung across to engage the nose of an animal, the chains 196 being utilized to secure both bars in position.

As will now be apparent, the adjustable mounting of the assembly carrying the plates 122, 138 permits such plates to be moved up or down to adjust the height and size of the opening therebetween to the size of the animal being positioned in the chute. For example, if small calves were being handled, it would be desirable that the plates 138 would be moved to their lowest possible position and that the plates 122 lowered to maintain an opening of small size. On the other hand, if large steers were being handled, it would be desirable to raise the plates 122 to their highest possible position and to raise the position of the plates 138 so that their upper edges would be just below the normal neck height of the animals.

As described previously, the side bars 84 of the side panels may be lowered as desired to permit access to the upper parts of an animal and the subpanels 68 may be removed as desired to permit access to the lower parts of an animal held in the chute.

When an animal is to be released from a chute, first the neck hold-down bar 190 is released and placed in the holder 194 and the nose bar 200 is swung to one side. If it is desired separately to release the neck clamping bars 180, 182, the operator may do so by grasping the handle 340 and pulling the lever 334 toward him. This, as discussed before, will rotate the shaft 328 lifting the ratchet bar 322 free of the catch 324 whereupon the spring 342 will swing the lever 320 in a counterclockwise direction as shown in FIG. 10 swinging the arms 308, 312 apart permitting the neck clamping bars to be drawn apart by the springs 186.

If it is desired separately to release the side panels 46, the operator may do so by pulling downwardly upon the handle 288. This will cause the pawl 278 to be moved out of latching position so that the drum 274 and shaft 272 are free to rotate. The tension of the springs 103 and the tendency of the panels to swing downwardly will cause the side panels to swing to open position and against the stops 101. As the shaft 272 is rotated by the pulling off of turns of the cable 292, the rope 288 will be rewound upon the drum 274.

Finally, the discharge gates may be swung open by pulling downwardly upon the lever 354 which causes the shaft 344 to pivot and the latches 160, 144 to be moved to unlatching position as described above whereupon the spring 228 will cause the arms 214, 224 to swing the gate members 102, 104 to open position.

If with the neck clamping bars 180, 182 and side panels 46 in their clamping position and the gate members 102, 104 closed an operator wishes simultaneously to release them all, he can accomplish this by pulling downwardly upon the lever 354. This will pivot the shaft 344 releasing the catches 160, 144 as previously described and will also swing the arm 338 to free the pawl 278 permitting the drum 274 and shaft 272 to rotate so as to permit the side panels to swing open. At the same time the arm 338 swings to free the drum, it will engage the stop 356 on the lever 334 causing such lever to swing to free the ratchet bar 322 holding the neck clamping bars in their clamping position. As soon as the ratchet bar is freed, the neck clamping bars can move to their open position as described above. Such simultaneous action is frequently desirable when a highly excited animal is held within the chute and it is desired to free him instantly and prevent him from possibly injuring himself as he might do struggling under partial restraint.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:

1. A cattle chute comprising a frame, a platform for holding an animal, a pair of side panels mounted in opposite sides of said platform, a pair of discharge gate members pivotally mounted at one end of said platform for movement between closed and open positions, an entrance gate at the other end of said platform having a normally closed position and movable to an open position, and manually operable means connected to said discharge gate members and said entrance gate operable first to swing the former from open to closed position and thereafter to move the latter to open position.

2. A cattle chute comprising a frame, a platform for holding an animal, a pair of side panels mounted in opposite sides of said platform, discharge gate means mounted at one end of said platform for movement between closed and open positions, an entrance gate means at the other end of said platform having a normally closed position and movable to an open position, and manually operable means connected to said discharge gate means and said entrance gate means operable first to move the former from open to closed position and thereafter to move the latter to open position.

3. A chute for restraining livestock comprising a platform upon which an animal may stand, a pair of side panels hingedly mounted at their bottom edges one on each of the opposite sides of said platform for movement between a clamping position against the sides of an animal standing on said platform and an open position wherein said side panels are spaced from such animal, gate means at each of the opposite ends of said platform, one of said gate means including a pair of neck clamping bars hingedly mounted for swinging movement between a clamping position in engagement with the neck of such animal and an open position spaced from said neck, and manually operable means operatively connected to said neck clamping bars and said side panels operative upon actuation first to move said neck clamping bars from open to clamping position and thence upon further actuation to move said side panels from open to clamping position.

4. A chute for restraining livestock comprising a platform upon which an animal may stand, a pair of side panels hingedly mounted at their bottom edges one on each of the opposite sides of said platform for movement between a clamping position against the sides of an animal standing on said platform and an open position wherein said side panels are spaced from such animal, gate means at each of the opposite ends of said platform, one of said gate means including a pair of neck clamping bars hingedly mounted for swinging movement between a clamping position in engagement with the neck of such animal and an open position spaced from said neck, manually operable means operatively connected to said neck clamping bars and said side panels operative upon actuation first to move said neck clamping bars from open to clamping position and thence upon further actuation to move said side panels from open to clamping position, releasable latch means for retaining said neck clamping bars and said side panels in said clamping position, and manually operable means for independently releasing the said latch means for said neck clamping bars and said side panels independently of each other.

5. A chute for restraining livestock comprising, a frame, a platform upon which an animal may stand, a pair of side panels hingedly mounted at their bottom edges to opposite sides of said platform, manually operable means for swinging said panels into clamping position against the sides of said animal, catch means for releasably retaining said panels in said clamping position, means connected to said panels for swinging the same upon release of said catch means to an open position away from the sides of said animal, a pair of discharge gate members hingedly mounted on said frame at one end of said platform for swinging movement toward and away from each other between closed and open positions, respectively, means urging said gate members to open position, latch means for releasably retaining said gate members in closed position, and manually operable means connected to said catch means and said latch means for simultaneously releasing the same to permit said side panels to swing to said open position, and said gate members to swing to open position simultaneously.

6. A chute for restraining livestock comprising, a frame, a platform upon which an animal may stand, a pair of side panels hingedly mounted at their bottom edges to opposite sides of said platform, manually operable means for swinging said panels into clamping position against the sides of said animal, catch means for releasably retaining said panels in said clamping position, means connected to said panels for swinging the same upon release of said catch means to an open position away from the sides of said animal, a pair of discharge gate members hingedly mounted on said frame at one end of said platform for swinging movement toward and away from each other between closed and open positions, respectively, means urging said gate members to open position, first latch means for releasably retaining said gate members in closed position, a pair of neck clamping bars pivotally mounted one in each of said gate members for movement when said gate members are closed between a neck clamping position and an open position, second latch means for releasably holding said neck clamping bars in said clamping position, means urging said neck clamping bars to open position, and manually operable means connected to said catch means, said first latch means and said second latch means for simultaneously releasing the same to permit said side panels to swing to said open position, and said neck bars and said gate members to swing to open position.

7. A chute for restraining livestock comprising, a frame, a platform upon which an animal may stand, a pair of side panels hingedly mounted at their bottom edges to opposite sides of said platform, manually operable means for swinging said panels into clamping position against the sides of said animal, catch means for releasably retaining said panels in said clamping position, spring means connected to said panels for swinging the same upon release of said catch means to an open position away from the sides of said animal, a pair of discharge gate members hingedly mounted on said frame at one end of said platform for swinging movement toward and away from each other between closed and open positions, respectively, spring means urging said gate members to open position, first latch means for releasably retaining said gate members in closed position, a pair of neck clamping bars pivotally mounted one in each of said gate members for movement when said gate members are closed between a neck clamping position and an open position, second latch means for releasably holding said neck clamping bars in said clamping position, spring means urging said neck clamping bars to open position, and manually operable means connected to said catch means, said first latch means and said second latch means for simultaneously releasing the same to permit said side panels to swing to said open position, and said neck bars and said gate members to swing to open position simultaneously.

8. A chute for restraining livestock comprising, a frame, a platform upon which an animal may stand, a pair of side panels hingedly mounted at their bottom edges to opposite sides of said platform, manually operable means for swinging said panels into clamping position against the sides of said animal, catch means for releasably retaining said panels in said clamping position, means connected to said panels for swinging the same upon release of said catch means to an open position away from the sides of said animal, a pair of discharge gate members hingedly mounted on said frame at one end of said platform for swinging movement toward and away from each other between closed and open positions, respectively, means urging said gate members to open position, first latch means for releasably retaining said gate members in closed position, a pair of neck clamping bars pivotally mounted one in each of said gate members for movement when said gate members are closed between a neck clamping position and an open position, second latch means for releasably holding said neck clamping bars in said clamping position, means urging said neck clamping bars to open position, a first manually operable means connected to said catch means for solely effecting release thereof, a second manually operable means connected to said first latch means for solely effecting release thereof, and a third manually operable means connected to said second latch means for effecting release thereof, said third manually operable means also being connected to said catch means and said first latch means for simultaneously releasing the same with said second latch means.

9. A chute for restraining livestock comprising, a frame, a platform upon which an animal may stand, a pair of side panels hingedly mounted at their bottom edges to opposite sides of said platform, manually operable means for swinging said panels into clamping position against the sides of said animal, catch means for releasably retaining said panels in said clamping position, means connected to said panels for swinging the same upon release of said catch means to an open position away from the sides of said animal, a pair of discharge gate members hingedly mounted on said frame at one end of said platform for swinging movement toward and away from each other between closed and open positions, respectively, means urging said gate members to open position, first latch means for releasably retaining said gate members in closed position, a pair of neck clamping bars pivotally mounted one in each of said gate members for movement when said gate members are closed between a neck clamping position and an open position, second latch means for releasably holding said neck clamping bars in said clamping position, means urging said neck clamping bars to open position, a first manually operable means connected to said catch means for solely effecting release thereof, a second manually operable means connected to said first latch means for solely effecting release thereof, and a third manually operable means connected to said second latch means for effecting release thereof.

References Cited in the file of this patent

UNITED STATES PATENTS

| | | |
|---|---|---|
| 2,139,710 | Yokum | Dec. 13, 1938 |
| 2,508,549 | Stephenson | May 23, 1950 |
| 2,522,170 | Fuller | Sept. 12, 1950 |
| 2,557,477 | Simon | June 19, 1951 |
| 2,576,654 | Thorson | Nov. 27, 1951 |
| 2,593,559 | Heldenbrand | Apr. 22, 1952 |
| 2,851,993 | Hettinger | Sept. 16, 1958 |

FOREIGN PATENTS

| | | |
|---|---|---|
| 550,027 | Great Britain | Dec. 18, 1942 |